US011365974B2

(12) United States Patent
Mendez et al.

(10) Patent No.: US 11,365,974 B2
(45) Date of Patent: Jun. 21, 2022

(54) NAVIGATION SYSTEM

(71) Applicants: Arm Limited, Cambridge (GB); Apical Limited, Cambridge (GB)

(72) Inventors: Roberto Lopez Mendez, Cambridge (GB); Daren Croxford, Swaffham Prior (GB)

(73) Assignees: Arm Limited, Cambridge (GB); Apicai Limited, Cambridge (GB)

(*) Notice: Subject to any disclaimer, the term of this patent is extended or adjusted under 35 U.S.C. 154(b) by 10 days.

(21) Appl. No.: 16/520,039

(22) Filed: Jul. 23, 2019

(65) Prior Publication Data
US 2021/0025717 A1 Jan. 28, 2021

(51) Int. Cl.
*G06K 9/00* (2022.01)
*G01C 21/20* (2006.01)
*G06T 7/70* (2017.01)

(52) U.S. Cl.
CPC .............. *G01C 21/206* (2013.01); *G06T 7/70* (2017.01); *G06T 2207/30204* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2015/0071493 A1* | 3/2015 | Kajiwara | G06F 3/011 382/103 |
| 2016/0143500 A1* | 5/2016 | Fong | A47L 9/30 15/319 |
| 2020/0089313 A1* | 3/2020 | Himane | G06F 3/013 |

OTHER PUBLICATIONS

"BLE Beacon Indoor Positioning Systems Basics by Locatify," By Blaz, Mar. 13, 2015, Locatify, Available at: https://locatify.com/blog/indoor-positioning-systems-ble-beacons/.
"Introducing SLAM," by Sylwester Bala, Sep. 13, 2018, Arm Limited, Available at: https://community.arm.com/graphics/b/blog/posts/introducing-slam-technology.
"Update: Indoor Real-Time Navigation with SLAM on Your Mobile," by Roberto Lopez Mendez, Nov. 7, 2018, Available at: https://community.arm.com/developer/tools-software/graphics/b/blog/posts/indoor-real-time-navigation-with-slam-on-your-mobile.
"Detection of ArUco Markers," Open CV (Open Source Computer Vision Library), retrieved on Jun. 3, 2019 Available at: https://docs.opencv.org/3.1.0/d5/dae/tutorial_aruco_detection.html.

* cited by examiner

*Primary Examiner* — Atiba O Fitzpatrick
(74) *Attorney, Agent, or Firm* — Vierra Magen Marcus LLP

(57) ABSTRACT

A navigation system uses markers that are identifiable in images of an environment being navigated to determine the location of a portable device in the environment. The portable device takes images of the environment, and those images are analysed to identify markers in the images and the pose of the portable device based on the image of the marker. The identified marker and the determined pose of the portable device are then used to determine the location and orientation of the portable device in the environment being navigated.

17 Claims, 7 Drawing Sheets

NAVIGATION SYSTEM

BACKGROUND

The technology described herein relates to a navigation system and in particular to techniques for navigating using a portable device.

Satellite navigation, such as the Global Positioning System (GPS), is commonly used to determine the location of a portable device, such as a mobile telephone. However, satellite-based navigation may be inappropriate for, or incapable of, determining the location of a portable device in or relative to some environments. This may be the case, for example, in environments in which the portable device is incapable of receiving appropriate satellite, e.g. GPS, signals, such as indoors, underground or in areas of poor reception, etc., or where the environment is not stationary relative to the earth's surface, such as aboard a ship. In addition, the accuracy of satellite-based navigation may be insufficient for navigation in some, e.g. complex, environments.

It is known therefore to use other techniques, such as active beacons or WiFi signals to navigate in an, e.g. indoor environment. However these techniques can require relatively expensive and/or powered hardware to be present in the environment being navigated.

Simultaneous localisation and mapping (SLAM) techniques have also recently been developed and used for navigation using a portable device, e.g., in an indoor environment. In these techniques, the location of a portable device within an environment relative to an initial starting point is estimated from images of the environment, typically together with inertial tracking, for example based on information from the portable device's inertial motion units (IMUs, e.g. accelerometers). However, such SLAM based navigation techniques only provide relative positioning information and can suffer from problems regarding initialisation of the tracking and from the accumulation of measurement errors over time, leading to "drift" (i.e. an ever increasing difference between where the system thinks the portable device is located in the environment and the actual location of the portable device).

The Applicants believe therefore that there remains scope for improvements to navigation systems, and in particular to navigation systems for tracking the location of a portable device within a more challenging environment, such as indoors.

BRIEF DESCRIPTION OF THE DRAWINGS

A number of embodiments of the technology described herein will now be described by way of example only and with reference to the accompanying drawings, in which.

Like reference numerals are used for like elements throughout the figures, where appropriate.

DETAILED DESCRIPTION

Figure 1:
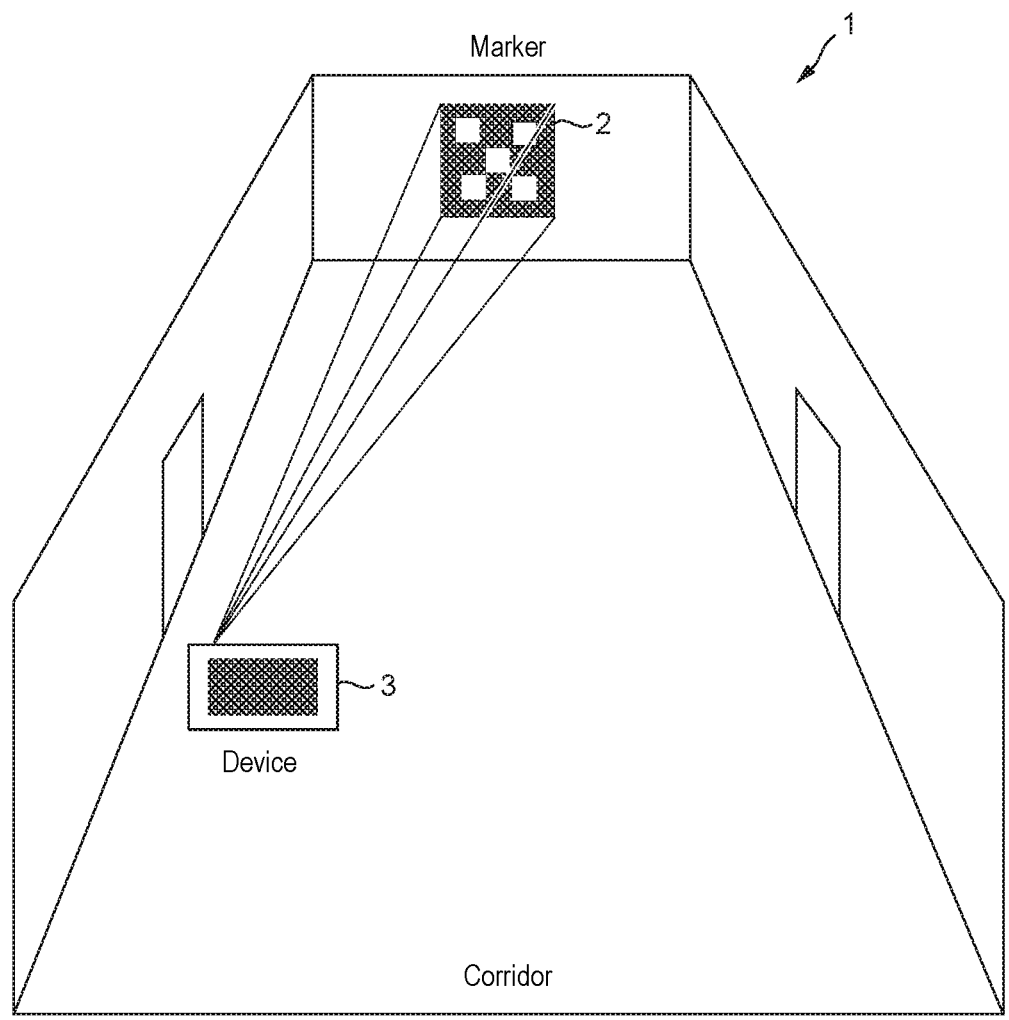
FIGS. 1, 2 and 3 show schematically the use of markers to determine the location of a portable device in an environment in embodiments of the technology described herein.

A first embodiment of the technology described herein comprises a navigation system for determining the location and orientation of a portable device in an environment, the navigation system comprising:

a stored set of navigation information representative of an environment to be navigated, the stored navigation information representative of the environment including information indicative of the location within the environment of markers in a set of plural markers arranged within the environment, each marker being configured so as to be identifiable in an image of the environment and being configured so as to allow the pose of a portable device that has taken an image of the environment containing the marker to be determined from the image of the environment containing the marker;

a portable device comprising an image sensor operable to take images of an environment;

an image analysis system configured to analyse images taken of an environment by a portable device and to determine whether a marker of a set of plural markers arranged within an environment is present in an image taken by the portable device and to, when a marker is identified in an image taken by a portable device, determine the pose of a portable device based on the image of the marker; and a navigation processing system configured to use information indicative of a marker identified in an image of an environment, the pose of a portable device determined by the image analysis system, and the stored navigation information representative of an environment to be navigated, to determine the location and orientation of the portable device in the environment to be navigated.

A second embodiment of the technology described herein comprises a method of determining the location and orientation of a portable device in an environment being navigated, the method comprising:

the portable device taking one or more images of the environment being navigated;

an image analysis system determining whether a marker of a set of plural markers arranged within the environment being navigated is present in an image of the environment taken by the portable device;

and when a marker is identified in an image taken by the portable device:

the image analysis system determining the pose of the portable device based on the image of the marker; and a navigation processing system determining the location and orientation of the portable device in the environment being navigated based on the marker identified in the image of the environment, the determined pose of the portable device, and stored navigation information representative of the environment being navigated, the stored navigation information representative of the environment being navigated including information indicative of the location within the environment of the markers in the set of plural markers arranged within the environment being navigated.

The navigation system and method of the technology described herein uses a set of markers that can be detected in images of an environment to determine the location of a portable device within the environment. As will be discussed further below, by detecting the markers within the environment, the "absolute" location (position) of a portable device in an environment can be more accurately determined, and a portable device can be more accurately tracked within the environment (and thus navigate within the environment) as compared, e.g., to existing SLAM techniques (and issues such as initialisation and "drift" that arise in existing SLAM techniques can be avoided through the detection of the markers as the portable device (a user) moves through the environment).

Furthermore, because the markers can be identified and are detectable from images of the environment, the markers themselves do not need to be "active" or powered in any way, and so can simply be "passive", e.g. visually, detectable markers (in contrast to techniques that use "active" beacons or WiFi signals, for example, that may require the presence of active and/or powered hardware within the environment to facilitate navigation).

Moreover, in the technology described herein, the markers that are located in the environment and that can be detected in images of the environment are configured so as to allow the "pose" (i.e. the position and orientation) of the image sensor (e.g. camera) (and thus of the portable device) that is taking the image relative to the marker to be determined. As such, the markers do not merely allow it to be determined that the portable device has reached a particular location in the environment, but also allow both the position and the orientation of the portable device relative to the marker (and thus within the environment) to be determined. This is advantageous because it allows the (absolute) position of the portable device in the environment to be more accurately determined (rather than just a position relative to some other, e.g. starting, position in the environment), and, also, the direction in which the portable device is facing and its orientation (which is particularly useful in the case of navigation). It will accordingly be appreciated that using markers that are markers from which the "pose" (i.e. the position and orientation) of a portable device can be determined is particularly advantageous in the context of a navigation system.

The environment that is to be navigated in the technology described herein can be any suitable and desired environment that it is desired for portable devices to be able to navigate in. In an embodiment, the environment is an indoor environment, such as a building or buildings (and in particular a large building such as an airport, train station, shopping mall, hospital, factory, etc.), or a vessel (such as a (large) ship). Other environments would, of course, be possible.

The navigation system of the technology described herein stores navigation information representative of the environment to be navigated. This navigation information includes in particular the location within the environment of particular markers within the environment that are to be used for navigation purposes (as discussed above and as will be discussed in more detail below).

The stored navigation information can include the location of the navigation markers within the environment in any suitable and desired manner. In an embodiment, the position in terms of an appropriate coordinate system, such as the x, y, z, position, of a (and each) marker in the environment is stored.

In an embodiment, the navigation information includes further information relating to a (and each) marker, such as, for example, and in an embodiment, one or more of, and in an embodiment all of: the size of the marker (if each marker is the same fixed size then a "global" (common) marker size could be stored); identifiable (e.g. unique) features of the marker; and the orientation of the marker in the environment. This information may assist identification, and/or subsequent analysis, of the markers in images of the environment.

This marker information could be added to (included in) the stored navigation information in any suitable and desired manner. For example, it could be added to the navigation information, e.g., database, based on known properties of the markers. Additionally or alternatively, this information could be determined for the markers from the environment itself (e.g. by using appropriate measurements of the marker(s) in the environment) and then added to the navigation information, e.g., data base.

The navigation information representative of the environment can be configured and stored in any suitable and desired manner, and will, and in an embodiment does, comprise an appropriate navigation database for the environment in question. In an embodiment, the navigation information representative of the environment stores (at least) a map of the environment in which the location of (and any other information for) each marker within the environment is indicated.

This navigation information representative of the environment should be, and is in an embodiment, stored in suitable storage, such as one or more memories, of the navigation system. This navigation information could be stored on the portable device itself (and in one embodiment, that is what is done), or it could be stored remotely from the portable device, such as with a server that is remote from the portable device, for example as part of a network-based (e.g. Cloud-based) navigation service and system for portable devices (and in another embodiment, that is what is done).

As discussed above, the navigation system of the technology described herein uses the identification of markers within the environment to determine the location and orientation of the portable device when navigating the environment. Thus, there will be a set of plural, in an embodiment particular, in an embodiment selected, in an embodiment predetermined, markers in the environment that can be detected in images of the environment and that are to be used for the purpose of navigating the environment (and that the navigation information will store the location, etc., of).

The markers that are arranged within the environment that is to be navigated and that are detected in images of that environment can be any suitable and desired markers that can be detected in images of the environment.

The set of plural markers arranged within the environment can contain any suitable and desired number of markers. This may depend, for example, on the size of the environment that is to be navigated, and/or the relative visibility of markers within the environment.

The markers should be, and are in an embodiment, appropriately distributed in the environment so as to be appropriately visible to portable devices being used in the environment and at suitable locations to facilitate navigation within the environment. Thus, for example, in the case of a building, markers may be, and are in an embodiment arranged at every entrance to the building. Correspondingly, in environments that have relatively large, visually similar, regions (such as long, featureless corridors) (such that existing SLAM techniques (without the use of the markers) may find navigation within the environment more difficult), it may be desirable to have an increased density of markers compared to environments in which different regions are more readily visually distinguishable from each other. The distribution of markers may also take account of the likely action of users of portable devices that may wish to navigate the environment, such as whether users are likely to continuously, or only intermittently, use their portable devices (whether for navigation purposes or otherwise).

Thus, in an embodiment, the navigation system of the technology described herein comprises a set of plural markers arranged within an (the) environment to be navigated (and for which the navigation information is stored), each marker being configured so as to be identifiable in an image of the environment and being configured so as to allow the pose of an image sensor that has taken an image of the environment containing the marker to be determined from the image of the environment containing the marker.

The markers should accordingly be, and are in an embodiment, such that they can be seen in images of the environment and will not be (easily) occluded by other objects (such as in particular dynamic objects) within the environment. The markers also in an embodiment located within the environment so that they would be less accessible to users within the environment (so as to reduce the risk of users interfering with the markers in the environment). Correspondingly, the markers are in an embodiment static (do not move) within the environment.

Each marker is in an embodiment at a particular, in an embodiment different (to any other marker in the set), in an embodiment selected, location within the environment. Each marker in the environment is in an embodiment suitably distinguishable from any other markers included in the environment, so that each particular marker in the set of markers being used for navigation purposes can be uniquely identified within the environment. Thus, in an embodiment, each marker in a set of plural markers is uniquely identifiable within the set of plural markers (and is distinguishable from all the other markers in the set).

In one embodiment, the markers are visible in and detectable in the visible spectrum. However, it would possible to also or instead use markers that are, e.g. also or only (and in an embodiment only), visible and detectable in other parts of the electromagnetic spectrum. For example, infrared markers (markers that are detectable in the infrared spectrum) and/or ultraviolet markers (markers that are detectable in the ultraviolet spectrum) could be used instead or as well. It may, for example, be advantageous to use markers that are not visible in the visible spectrum, as that may help to avoid users interfering with the markers in the environment (as they would not be able to see the markers). Also, infrared or ultraviolet markers may be advantageous (and usable) in low-light environments, for example. (Markers that are visible in the visible spectrum could be illuminated with a suitable light source, such as a light of the portable device, in dark or low-light environments, if desired.) Thus in an embodiment, the markers are not detectable in the visual spectrum, and comprise, for example, markers that are detectable in the infrared and/or ultraviolet spectrum.

The markers are such that the pose (position and orientation) of the image sensor (e.g. camera) (relative to a marker) can be determined from an image of the marker. This can be achieved in any suitable and desired manner. For example, the marker should, and in an embodiment does, have an appropriate shape and/or features to allow the pose of the image sensor (portable device) to be determined (i.e. such that the marker will have a detectably distinguishable appearance depending upon the pose of the image sensor relative to the marker).

This can be achieved in any suitable and desired manner. For example, the marker may be configured to have an appropriate two dimensional shape or pattern that allows the pose (relative to the marker) to be determined. In an embodiment, the markers provide enough correspondences (such as having four corners) to allow the image sensor pose to be determined.

It would be possible to use (suitable) existing objects in the environment as the markers for the purpose of navigating in the manner of the technology described herein (and in one embodiment this is done). In this case, the navigation information representative of the environment would, inter alia, store the locations of particular objects that exist in the environment, and then images of the environment would be analysed to detect those objects for the purposes of navigation in the manner of the technology described herein.

In an embodiment, the markers that are used for the purpose of navigating in the system of the technology described herein comprise markers that have been placed in (added to) the environment specifically for the purpose of navigation in the manner of the technology described herein. Such use of "bespoke" markers can simplify the marker recognition process (whereas "natural" objects in the environment may require more complicated and/or sophisticated object recognition to be detected in images of the environment).

Where markers are added to the environment for the purpose of navigation in the manner of the technology described herein, then, as discussed above, those markers should be, and are in an embodiment, placed (arranged) and distributed in the environment so as to be suitable for supporting navigation within the environment. Thus they should be, and are in an embodiment, placed on appropriate features (surfaces) within the environment, such as on walls within the environment (and are in an embodiment placed on static features within the environment (such that the markers should not move within the environment)).

In an embodiment, binary square fiducial markers are used. Such markers will provide enough correspondences to obtain the image sensor pose, and also the inner binary codification can be used to uniquely identify the markers, and, if desired, to convey additional information as well. The use of such markers also facilitates the marker identification and information coding being more robust in use, as error detection and correction techniques can be applied to such markers.

In an embodiment, augmented reality (AR) markers are used for the purposes of the technology described herein, such as, for example, and in an embodiment, so-called ArUco markers (and equivalent such markers).

It would also be possible to use a combination of existing objects and specifically placed "bespoke" markers for navigation in the manner of the technology described herein, if desired. For example, "bespoke" markers could be looked for initially, but once a suitable marker is identified, a "natural" object in the environment could also be attempted to be detected (and/or vice-versa). For example, "natural" objects could be looked for as and when it is determined, e.g. from inertial tracking or the detection of "bespoke" markers, that a suitable reference object should be present in the environment. In this case, the object recognition process would be activated in addition to the marker recognition process (only) when it is determined to be appropriate to do that. Other arrangements would, of course, be possible.

In an embodiment, as well as allowing the detecting device's "pose" to be determined, one or more, and in an embodiment all, of the markers can also convey other information (that can be triggered or identified from recognition of the marker in question). For example, a marker could encode the identity of the navigation information representative of the environment that the marker relates to, and/or the location where the navigation information, e.g. map, of the environment that the marker relates to is stored, with that information then being able to be derived, e.g., by the portable device from analysis of the marker in the image of the environment, with the portable device then, e.g., being able to use that information to identify and access the appropriate navigation information, such as a map, of the environment that the marker relates to.

Thus, in an embodiment, the method of the technology described herein further comprises (and, e.g., the image analysis system, etc., is appropriately configured to) identifying from a marker identified in an image of the environment, information relating to the navigation information for the environment that the marker relates to, and then using that information to access the navigation information for the environment that the marker relates to.

Other appropriate information could be encoded in a marker or markers, if desired. For example, a marker could encode "permissions" information to control the particular portable devices that have access, e.g., to navigation or other information relating to the environment in question.

The portable device in the system of the technology described herein can be any suitable portable (electronic) device that has an appropriate image sensor (and that can perform any "on-device" processing that is required for operation in the manner of the technology described herein). Thus it could, for example, and in an embodiment, comprise a mobile phone or tablet. In an embodiment, the portable device comprises a wearable device, such as a head worn device, such as a headset, such a pair of glasses (e.g. AR glasses). In one embodiment, it is a head mounted display device, such as an Augmented Reality (AR) head mounted display (HMD). It could also, e.g., be an Internet of Things device with a camera, inertial tracking sensors, and an appropriate processor or processors, and some form of output, such as a display, or potentially even without a display and using, for example, audio or tactile output to a user instead.

In an embodiment, the portable device comprises an, e.g. AR, head mounted display, together with an associated mobile phone (or other processing unit). There may also be another wearable device, such as a bracelet or watch, to provide haptic (tactile) feedback.

Other forms of portable device would, of course, be possible.

The portable device includes an image sensor that is operable to take (capture) images of an environment in which the portable device is located. The image sensor can be any suitable and desired image sensor that can capture images of the environment in which the portable device is located (and should be appropriate to the form of markers that are being used for navigation purposes).

In one embodiment, the image sensor is a camera of the portable device.

In an embodiment, the image sensor is an infrared sensor (so as to be able to detect infra-red visible markers). (In this case, as most cameras are infrared sensitive, an existing device camera could be modified by removing the infrared filter to allow infrared markers to be detected, for example. An RGB filter could be added to make the camera sensitive to IR only. The RGB and IR filters could be selectable and changeable in use, so as to select the sensitivity in use, if desired.)

Correspondingly, in an embodiment, the image sensor comprises a UV sensor (for use with UV visible markers). In this case, the portable device may, and in an embodiment does, also include some form of UV source (light) so as to be able to stimulate the UV visible markers.

In an embodiment, the portable device also includes a light that may be used to illuminate the environment.

The image sensor of the portable device is used to take images of the environment, which images are then analysed to detect markers in the images for the purpose of tracking the location, etc. of the portable device in the environment.

The images that are taken by the image sensor for the purposes of navigation in the technology described herein could be simply the images that are taken by a user of the portable device, as the user desires. However, in an embodiment, the portable device is configured to (and caused to) automatically (without the need for user intervention) take images of the environment when performing the navigation operation in the manner of the technology described herein. Thus, for example, and in an embodiment, a user of the portable device may activate the navigation operation in the manner of the technology described herein, with the portable device then operating to automatically take images of the environment once the navigation operation has been activated (and until that operation is stopped). In this case, the user could, for example, be prompted to take an initial image of the environment when the navigation operation is first activated, with the portable device then operating to automatically take images of the environment thereafter. Other arrangements would, of course, be possible.

The portable device (the image sensor of the portable device) may continuously take images of the environment (once "activated") (and in one embodiment that is what is done). For example, the image sensor may be used to video the environment, with that video then being analysed to detect the presence of markers in the environment.

In an embodiment, the portable device (the image sensor in the portable device) only takes (and thus captures) images of the environment periodically (with some or all of those images then being analysed to detect the presence of markers in the images). In this case, the images could be taken at particular, in an embodiment selected, in an embodiment predetermined, in an embodiment regular, time intervals (and in one embodiment, that is what is done).

Alternatively, or additionally, particularly in the case where some form of inertial tracking is also available via and/or used by the portable device, then images of the environment could be captured, in an embodiment periodically, based on movement of the portable device (in the environment) (and in an embodiment, this is what is done). For example, an image could be captured every time the portable device is determined to have moved a particular, in an embodiment selected, in an embodiment predetermined, distance from the location where the previous image was taken (e.g. based on SLAM/inertial tracking via the portable device).

Additionally or alternatively, images could be (automatically) captured to scan the environment for suitable markers based on the estimated location of the portable device. This would then allow the device to capture images to look for markers when it is expected that there would be a marker in the local environment. In this case, the estimated location of the portable device would in an embodiment be based on the location estimated using captured images, e.g. together with appropriate inertial tracking information so as to, for example, detect when the user has moved to a new location where a new marker may be expected to be located. For example, the portable device may have knowledge of the distribution of markers around the environment and therefore know when, approximately, to search for a marker in an image. The portable device may also know when the user is re-tracing their steps, and, e.g., whether a marker was seen or not, and trigger analysis for a marker or not, accordingly.

Thus, in an embodiment, in operation of the navigation system of the technology described herein, the movement of the portable device within the environment is tracked, e.g., and in an embodiment, based on SLAM and/or inertial tracking, and the image sensor is triggered to take images of the environment based on that tracking, with those images then being analysed to identify markers in the images so as to determine the location and orientation of the portable device in the environment.

Other arrangements would, of course, be possible.

The navigation system of the technology described herein includes an appropriate image analysis system that is operable to analyse images of an environment captured by the image sensor of the portable device to determine whether markers of a set of markers for an environment being navigated are present in images captured by the image sensor. The image analysis system may be provided as desired, for example by means of an appropriate processor (processing circuit), e.g. that executes an image analysis engine.

When a marker of the set of markers is present in an image, the image analysis should, and in an embodiment does, identify the particular marker that has been detected in the image, and the pose of (the image sensor of) the portable device based on (and relative to) the marker.

The presence, etc., of a marker in an image captured by the image sensor, and the pose of the portable device, etc., can be determined in any suitable and desired manner, such as, and in an embodiment, by using appropriate object recognition and image analysis techniques. In an embodiment, a (suitable) computer vision process is used to determine whether a marker of a set of markers is present in an image captured by the image sensor (and to then identify the marker and determine the pose, etc.).

Thus the system may, and in an embodiment does, include a suitable processor (circuit) that is able to perform (e.g. execute) an appropriate image analysis operation (e.g. computer vision operation) to identify the presence of a marker in an image captured by the image sensor and to then analyse that marker in the image for the purposes of the technology described herein.

Correspondingly, the image analysis system and process in an embodiment has knowledge of, and is configured to recognise, the particular markers being used in an environment, so that it can identify those markers in images. For example, there may be a stored set of reference marker images that the image analysis operation can then compare to images taken by the portable device In one embodiment, each image that is captured by the image sensor of the portable device (when the navigation process is in operation) is analysed to determine whether a marker of the set of markers is present in the image. Alternatively, it would be possible to analyse only some but not all of the images captured by the image sensor for the presence of a marker, for example in the case where the image sensor takes a continuous video of the environment (and so it may be that only certain frames of the video will be analysed for the presence of a marker).

In the case where only some but not all of the images captured by the image sensor are to be analysed for the presence of a marker, the images that are analysed could be based, e.g., and in an embodiment, on the passing of particular, e.g., predetermined time intervals, and/or on the movement of a portable device (within the environment) (such as when the portable device has moved a particular, in an embodiment predetermined, distance from the location of the last image that was analysed, and/or when, as discussed above, it is expected that a marker will be present in an image taken of the environment at the portable device's (estimated) current location).

In the case where the technology described herein is used in conjunction with SLAM-based tracking of the movement of the portable device (such that for the SLAM process images of the environment will be captured and analysed in any event), then the captured images can be both used for the SLAM process and separately to determine if there is an image of a marker. In this case the frequency of image processing may be different between the SLAM processing and the image processing to detect a marker. For example, images for the purposes of the SLAM processing may be processed at a higher frequency than for detecting markers in the manner of the technology described herein.

In addition, as discussed above, inertial tracking could be used to determine whether the portable device has moved significantly, and if the portable device hasn't moved significantly, then image processing (whether for SLAM or for the purpose of detecting a marker) may not be carried out and/or may be carried out at a lower frequency. In addition, where the portable device's movement is tracked and it can thereby be determined that the portable device has been to the region of the environment before, and it is known that no marker was present at that location, then image processing of the location in question could be omitted, if desired.

Other arrangements would, of course, be possible.

The analysis of an image captured by an image sensor for the presence, etc., of a marker may be performed on the portable device itself (and in this case the portable device will itself comprise the appropriate image analysis circuit/processor and be operable to receive and analyse images from the image sensor for the presence of markers).

Alternatively, the image analysis could be performed remotely from the portable device itself, for example in an appropriate processing device, such as a server, that is accessible to the portable device via, for example, a wireless connection. For example, the image analysis may be provided as a "Cloud"-based (an internet-based) service that is accessible to the portable device. In this case therefore, the portable device would transmit images received from its image sensor to the remote image analysis system, and then, e.g., receive appropriate responses from that image analysis system.

Once a marker has been identified in an image from the image sensor, and the pose of the portable device based on the image containing the marker determined, that information is then used, together with the stored navigation information representative of the environment, by an appropriate navigation processing system, to determine the location and orientation of the portable device in the environment.

The location and orientation of the portable device in the environment can be determined from the identified marker, the determined pose of the portable device, and the stored navigation information representative of the environment, in any suitable and desired manner.

In an embodiment, the location of the particular, identified, marker within the environment is determined using the stored navigation information indicative of the location within the environment of each of the markers in the environment. This will then, e.g., and in an embodiment, give the location of the marker in question in the environment.

Thus, in an embodiment, the image analysis system is configured to (and operates to this) determine whether a marker of the set of markers is present in an image of an environment, and when it is determined that a marker of the set of markers is present in an image of an environment, the navigation processing system operates to (and is configured to) determine from the stored navigation information, the location of the identified marker within the environment, and to then use the determined location of the marker in the environment to determine the location of the portable device within the environment.

The marker location determined from the stored navigation information is then used together with the determined pose of the portable device (relative to the marker) to determine the location and orientation of the portable device within the environment (as the pose can be used to determine the position and orientation of the portable device relative to the location (position) of the marker in the environment).

In particular, and as will be appreciated by those skilled in the art, analysis of the marker will allow the "instant pose" of the portable device relative to the marker and correspondingly in the environment to be determined with relatively high accuracy (as it is known from the stored navigation information with higher precision where the marker in question is in the environment), thereby allowing the absolute location (position) and the orientation of the portable device in the environment to be determined with a higher degree of accuracy.

This more accurate "instant" portable device location and orientation in the environment can then be used to, e.g. if necessary, correct the location and/or, e.g., orientation, provided by any relative tracking of the position of the portable device in the environment, for example using SLAM and/or inertial tracking.

The navigation processing system that performs this analysis can be configured and operable in any suitable and desired manner. Thus, the navigation system may, and in an embodiment does, include a suitable processor (processing circuit), e.g. that executes a navigation processing engine, that is able to perform the navigation processing based on the information indicative of the marker identified in an image and the determined pose of the portable device from the image analysis system, together with the stored navigation information.

The navigation processing using the identified marker, determined pose, and the stored navigation information may be performed on the portable device itself (and in this case the portable device will itself comprise the appropriate navigation processing circuit/processor and be operable to receive the determined marker identity and pose and to access the stored navigation information).

Alternatively, the navigation processing could be performed remotely from the portable device itself, for example in an appropriate processing device, such as a server, that is accessible to the portable device via, for example, a wireless connection (e.g. as a "Cloud"-based (an Internet-based) service that is accessible to the portable device). In this case therefore, the "remote" navigation processing system will receive the appropriate marker identity and pose information and access the stored navigation information to perform the navigation processing, and then, e.g., and in an embodiment, return information relating to that navigation processing to the portable device, as appropriate.

Once the location and orientation of the portable device in the environment has been determined based on the identification of a marker in an image of the environment, then that information can be used as desired. It is in an embodiment used to provide information associated with and relative to the determined location of the user to the user. For example, and in an embodiment, the information may be used to display the user's location and orientation to the user, such as, and in an embodiment, displaying the user's location and orientation on a map of the environment. This may be done, e.g., and in an embodiment, via a suitable display of the portable device (e.g. via the display of an AR head mounted display).

Other arrangements could also or instead be used, such as providing audio or visual events or stimulations, such as messages, such as audio and/or visual directions, or otherwise providing information about the location reached (whether visual or audio or both), if desired (and in an embodiment this is what is done). Haptic (tactile) feedback (e.g. vibration) could also or instead be provided, e.g. via a separate wearable device such as a watch or bracelet. This could be in addition to or instead of displaying the user's location on a map. Thus in an embodiment, the determination of the location and/or orientation of the portable device is used to trigger an appropriate event associated with the location in question (which event is in an embodiment providing some form of signal or stimulus via the portable device).

Other arrangements would, of course, be possible.

Thus, in an embodiment, the navigation system of the technology described herein further comprises a navigation information providing system (e.g. processor and/or processing circuit) that is configured to provide (and that provides) navigation information via the portable device (visually and/or audibly) in response to, and based on, the determined location and orientation of the portable device.

Again, the processing relating to the provision of information associated with and relative to the determined location of the portable device to the user could be performed entirely on the portable device itself (in which case the portable device would be provided with appropriate processors and processing circuits for that purpose), or at least some of that processing could be performed remotely to the portable device, with the relevant information and/or commands, etc., then being returned to the portable device appropriately to trigger the appropriate operation of the portable device.

The navigation system of the technology described herein could use the markers alone to navigate in the environment (e.g. where there is a suitable distribution of markers in the environment) (and in one embodiment, that is what is done).

In an embodiment, the navigation uses the markers in conjunction with one or more other location determining techniques, such as, and in an embodiment, SLAM (simultaneous location and mapping) and/or inertial tracking of the portable device.

Thus, in an embodiment, the navigation system of the technology described herein also comprises a SLAM tracking system configured to track movement of the portable device using a SLAM process, and uses both the detection of markers in images of the environment and a SLAM process to determine and track the location of the portable device in the environment.

The SLAM system and process may be configured as desired, and may, e.g., and in an embodiment, comprise one or more image sensors for capturing images of the environment, and an appropriate SLAM processor and/or processing circuit, e.g. executing an appropriate SLAM process (engine) configured to analyse images of the environment to track movement of the portable device. The SLAM process may also, if desired, use depth information, which could, e.g., be extracted from images of the environment (e.g. using a neural network if required), and/or be provided by means of a depth sensor of the portable device.

Correspondingly, in an embodiment, the navigation system of the technology described herein comprises an inertial tracking system configured to inertially track movement of the portable device (in the environment), and uses both the detection of markers in images of the environment and an inertial tracking process to determine and track the location of the portable device in the environment.

The inertial tracking system may be configured as desired, and may, e.g. and in an embodiment, comprise one or more inertial tracking sensors, such as accelerometers, and/or gyroscopes, on (of) the portable device, and an appropriate inertial tracking processor and/or processing circuit, e.g. executing an inertial tracking engine configured to use inputs from the inertial tracking sensors to track movement of the portable device.

Where SLAM and/or inertial tracking is used, then that could be used, e.g., and in an embodiment, to track the location of the portable device from the immediately preceding location in the environment that has been identified using a marker detected in an image of the environment, e.g. until a next marker is detected, and so on. In this case, the navigation system in an embodiment operates to determine the location of the portable device in the environment using a marker detected in an image of the environment, and then uses SLAM/inertial tracking techniques to detect movement of the portable device from that location until a marker is again detected in an image of the environment (and then locates the portable device based on that marker in the image), and so on.

This will then allow, for example, the use of markers in the environment to periodically identify and correct drift when using SLAM/inertial tracking of the portable device in the environment.

In an embodiment, the determination of the location of the portable device in the environment using the detection of markers in images of the environment in the manner of the technology described herein is used in combination with SLAM and/or inertial tracking of the location of the portable device in the environment, and in particular, to initialize the location of the portable device in the environment for the SLAM/inertial tracking process, and to correct for drift of the SLAM/inertial tracking location determination in use.

In this case therefore the navigation system and process using the detection of markers in images of the environment would be used to address the initialisation and drift issues that can arise when using SLAM/inertial tracking alone (and, indeed, it is a particular advantage of the technology described herein that it can provide a relatively low-cost and easy to use system to correct and compensate for initialisation and drift issues that may arise when using SLAM/inertial tracking).

In these arrangements, when starting the navigation process, the detection of a marker in an image of the environment would in an embodiment be used to determine the initial location of the portable device in the environment (to a high degree of accuracy) (thereby initialising the, e.g. SLAM/inertial tracking process with an accurate "absolute" position in the environment). The user could, e.g., be prompted to point their portable device to a marker of the environment so that their initial position can be determined.

Thereafter, a SLAM/inertial tracking process would be used to track and determine the location of the portable device in the environment, with the portable device also operating to, e.g., periodically, take images of the environment and determine its location based on the detection of markers in those images.

In this case, any location determined from the detection of markers in an image could be used to replace (update) the location as determined by the SLAM/inertial tracking, and/or any position determined from the detection of a marker in an image could be compared to the current position determined based on the SLAM/inertial tracking, with the position based on the SLAM/inertial tracking then only being replaced (updated) based on the location determined from the detection of the marker in an image if it is determined that the "marker"-based location differs from the SLAM/inertial tracking-based location by more than a particular, in an embodiment selected, in an embodiment predetermined, (threshold) amount. In this case, the tracking of the portable device would then rely on the SLAM/inertial tracking until the error (drift) in the SLAM/inertial tracking exceeds the particular (threshold) amount, with the location of the portable device then being corrected based on the detection of a marker in an image of the environment.

In these arrangements, the capturing of images of the environment and their analysis so as to, e.g. if necessary, correct the location determined based on the SLAM/inertial tracking, is in an embodiment configured to, and in an embodiment operates as, an automatic, background, process while the SLAM/inertial tracking is being carried out (i.e. so that it operates without any need for user intervention). Thus, while performing the SLAM/inertial tracking, the portable device will also be controlled to, e.g. periodically, automatically capture and/or analyse images of the environment and to analyse some or all of those images for the presence of markers (and to then check, and if necessary, update, the currently identified location of the portable device based on the presence of markers in the images, as appropriate).

In this case, as discussed above, in an embodiment the location of the device as determined by the SLAM/inertial tracking is in an embodiment used to trigger the capture of images of the environment so as to look for markers in the environment so as to update the SLAM/inertial tracking determined location of the portable device. For example, and in an embodiment, the SLAM/inertial tracking is used to determine when the portable device has moved to a location where a marker should be present, and to thereby trigger the capturing of an image by the portable device to try to detect that marker.

Other arrangements would, of course, be possible.

In an embodiment, the navigation system and method of the technology described herein is used when performing, and to perform, simultaneous localisation and mapping (SLAM) for and via the portable device, in an embodiment using, as discussed above, both (conventional) SLAM tracking of the movement of the portable device and navigation based on the detection of markers in images of the environment being navigated.

In an embodiment, the navigation system is able to and operates to provide "feedback" information on the markers in the environment, for example, and in an embodiment, relating to their distribution. For example, the system could identify missing or moved markers in use by cross-referencing the positions of markers detected in images of the environment with the expected positions of markers based on the stored information indicating the location of the markers in the environment.

The system could also track location drift when using SLAM/inertial tracking in use, and determine when, for example, any determined location drift is too much (e.g. exceeds a particular threshold), e.g. so as to guide the improvement and/or optimisation of the marker distribution in the environment. For example, the amount of location drift could be determined each time a marker is used to "correct" the "SLAM/inertially tracked" location of the portable device in the environment, and when it is determined that the amount of drift at a particular marker is above a particular, in an embodiment predetermined, threshold amount of drift, then it could be indicated that a marker should be moved, and/or that an additional, e.g. intermediately located marker, would be desirable and should be located in the environment.

Thus, in an embodiment, the navigation system is further configured to (and operates to) collect information relating to the distribution of markers in an environment based on the identification of markers in images of the environment taken by a portable device that is navigating the environment.

The "feedback" information could be, e.g., provided via the portable device to a user of the portable device, and/or it could be generated and provided by a remote service of the navigation system, e.g. to a system "controller" (e.g. in particular where the navigation system is provided as part of a remote service that can accessed by portable devices in the environment).

The technology described herein also extends to a portable device that is operable in the navigation system of the technology described herein. Thus, another embodiment of the technology described herein comprises a portable device for use in a navigation system, which navigation system is operable to determine the location of the portable device in an environment, the portable device comprising:

an image sensor operable to take images of an environment being navigated;

a processing circuit configured to provide images taken of an environment by the image sensor to an image analysis system configured to analyse images taken of an environment by the portable device and to determine whether a marker of a set of plural markers arranged within an environment is present in an image taken by the portable device and to, when a marker is identified in an image taken by the portable device, determine the pose of a portable device based on the image of the marker; and an output processing circuit configured to:
receive information indicative of a location and orientation of the portable device in the environment being navigated determined by a navigation processing system configured to determine the location and orientation of a portable device in an environment from information indicative of a marker identified in an image of an environment, the pose of a portable device determined by the image analysis system, and stored navigation information representative of an environment to be navigated, the stored navigation information representative of the environment being navigated including information indicative of the location within the environment of the markers in the set of plural markers arranged within the environment being navigated; and
provide an output to a user of the portable device based on the information indicative of a location and orientation of the portable device in the environment being navigated.

A further embodiment of the technology described herein comprises a method of operating a portable device in a navigation system, which navigation system is operable to determine the location of the portable device in an environment, the method comprising:

the portable device:
taking images of an environment being navigated using the portable device;
providing images taken of the environment being navigated to an image analysis system configured to analyse images taken of an environment by the portable device and to determine whether a marker of a set of plural markers arranged within an environment is present in an image taken by the portable device and to, when a marker is identified in an image taken by the portable device, determine the pose of a portable device based on the image of the marker; and
receiving information indicative of a location and orientation of the portable device in the environment being navigated determined by a navigation processing system configured to determine the location and orientation of a portable device in an environment from information indicative of a marker identified in an image of an environment, the pose of a portable device determined by the image analysis system, and stored navigation information representative of an environment to be navigated, the stored navigation information representative of the environment being navigated including information indicative of the location within the environment of the markers in the set of plural markers arranged within the environment being navigated; and
providing an output to a user of the portable device based on the information indicative of a location and orientation of the portable device in the environment being navigated.

As will be appreciated by those skilled in the art, these embodiments of the technology described herein can, and in an embodiment do, include any one or more or all of the optional features of the technology described herein.

Thus, for example, the image analysis process and image analysis system may be performed on, and be part of, the portable device itself, or may be remote to the portable device (with the portable device then transmitting the images to the remote image analysis system accordingly).

Correspondingly, the navigation processing and navigation processing system may be performed on, and be part of, the portable device itself, or may be remote to the portable device (with the portable device receiving the location, etc., data from the remote navigation processing system accordingly).

Similarly, the portable device may itself store the navigation information representative of the environment that is used for the navigation process (in which case the portable device will store a set of navigation information representative of an environment to be navigated, the stored navigation information representative of the environment including information indicative of the location within the environment of markers in a set of plural markers arranged within the environment, each marker being configured so as to be identifiable in an image of the environment and being configured so as to allow the pose of a portable device that has taken an image of the environment containing the marker to be determined from the image of the environment containing the marker), or that navigation information could be stored remotely to the portable device.

The technology described herein correspondingly also extends to an image analysis and navigation processing system that may be used with a portable device in the navigation system of the technology described herein.

Thus, another embodiment of the technology described herein comprises an apparatus for use in a navigation system, which navigation system is operable to determine the location of the portable device in an environment, the apparatus comprising:

one or more storage devices that store a set of navigation information representative of an environment to be navigated, the stored navigation information representative of the environment including information indicative of the location within the environment of markers in a set of plural markers arranged within the environment, each marker being configured so as to be identifiable in an image of the environment and being configured so as to allow the pose of a portable device that has taken an image of the environment containing the marker to be determined from the image of the environment containing the marker;

an image analysis system configured to receive and analyse images taken of an environment by a portable device and to determine whether a marker of a set of plural markers arranged within an environment is present in an image taken by a portable device and to, when a marker is identified in an image taken by a portable device, determine the pose of a portable device based on the image of the marker;

a navigation processing system configured to determine the location and orientation of a portable device in an environment from information indicative of a marker identified in an image of an environment, the pose of a portable device determined by the image analysis system, and the stored navigation information representative of an environment to be navigated; and an output processing system configured to provide to a portable device information indicative of a location and orientation of the portable device in an environment being navigated determined by the navigation processing system.

A further embodiment of the technology described herein comprises a method of operating a navigation system, which navigation system is operable to determine the location of a portable device in an environment being navigated, the method comprising:

storing, in one or more storage devices, a set of navigation information representative of an environment to be navigated, the stored navigation information representative of the environment including information indicative of the location within the environment of markers in a set of plural markers arranged within the environment, each marker being configured so as to be identifiable in an image of the environment and being configured so as to allow the pose of a portable device that has taken an image of the environment containing the marker to be determined from the image of the environment containing the marker;

receiving at an image analysis system, images taken of the environment by a portable device and determining by the image analysis system whether a marker of a set of plural markers arranged within the environment is present in an image taken by the portable device and, when a marker is identified in an image taken by the portable device, the pose of the portable device based on the image of the marker;

receiving at a navigation processing system the identity of a marker identified in an image taken by the portable device and the pose of the portable device determined by the image analysis system, and determining by the navigation processing system the location and orientation of the portable device in the environment from the marker identified in the image of the environment, the pose of the portable device determined by the image analysis system, and the stored navigation information representative of the environment to be navigated; and providing by an output processing system information indicative of the location and orientation of the portable device in the environment being navigated determined by the navigation processing system to the portable device.

As will be appreciated by those skilled in the art, these embodiments of the technology described herein can, and in an embodiment do, include any one or more or all of the optional features of the technology described herein.

As well as any components, circuits, functional units, etc., necessary for the particular operation in the manner of the technology described herein, the portable device can otherwise include any desired and suitable elements, circuits, components, etc. Thus the portable device may, and in an embodiment does, also comprise one or more of, and in an embodiment all of: a central processing unit (CPU) (a host processor), a graphics processing unit (GPU) (graphics processor), a display, a display controller, a system bus, local storage, in an embodiment in the form of a memory, and a memory controller. The memory may comprise, e.g., a main memory of the portable device. The display may be any suitable and desired display, such as, for example, a screen.

The portable device in an embodiment also includes appropriate wireless communication facilities, such as WiFi, Bluetooth, and/or mobile (cellular) network communications capabilities (processing circuits).

The portable device and/or navigation system also in an embodiment comprises, and/or is in communication with, one or more memories and/or memory devices that store the data described herein, and/or software for performing the processes described herein.

The navigation system and method of the technology described herein can be implemented in any suitable and desired fashion.

In an embodiment, the technology described herein is implemented by means of an appropriate "navigation" application executing on the portable device, which navigation application is operable to perform and/or to cause to be performed the various steps and processes of the technology described herein. In this case, the application may, e.g., be activatable by a user when the user wishes to navigate in an environment using the portable device.

In this case, and as discussed above, the application could perform some or all of the processes of the technology described herein on the portable device, for example in dependence upon the processing capability and resources of the portable device. Additionally or alternatively, the application could, as discussed above, be operable to communicate with a remote service, e.g. executing on a server, e.g., and in an embodiment, via a wireless network, such as over the Internet, which remote service performs some of the operations to provide the navigation system in the manner of the technology described herein.

In the latter case, the application executing on the portable device would be operable to communicate relevant data to, and receive relevant data from, a remote processor or processors (e.g. server or servers) which it is in communication with (e.g. via the Internet or another data network), with those remote processors (e.g. server or servers) then, e.g., and in an embodiment, performing the more processing intensive operations of the technology described herein in response to data (such as images) received from the application on the portable device, and then returning information appropriately to the application on the portable device to facilitate the appropriate, e.g., display to, and interaction with, a user of the portable device to allow the user to navigate in the environment in question.

Thus the application executing on the portable device could, and in an embodiment does, use a remote server or servers, such as a "Cloud-based" processing, to perform some of the processing operations, such as the more complex and processing intensive operations, of the technology described herein. In this case therefore, the overall process of the technology described herein will be performed by, and implemented in, the portable device and one or more remote processors that are in communication with the portable device.

The navigation application executing on the portable device correspondingly in an embodiment triggers the image sensor, such a camera of the portable device, to take appropriate images (photographs) of the environment while the navigation application is active, and/or prompts the user to take appropriate images of the environment. The navigation application may also perform any desired SLAM/inertial tracking processing that is to be performed as part of the navigation operation.

Other arrangements would, of course, be possible.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein directed to indoor navigation based on SLAM (Simultaneous Location and Mapping) techniques will now be described.

In the present embodiments, indoor navigation is performed based on SLAM but also using particular visual markers in the environment that is being navigated. In particular, a set of one or more visual markers are arranged in an environment in which the navigation is to be performed, and then a portable device whose position is to be tracked in the environment uses an image sensor such as a camera, to view the environment. Images captured by the portable device are then analysed to identify the markers in the environment, and to thereby determine the portable device's location in the environment.

FIG. 1 shows an exemplary part of an indoor environment 1 in which it is desired to track the location of a portable device 3, for example for the purposes of navigating in the indoor environment. In FIG. 1, the part of the indoor environment is exemplified as being a corridor, but other environments would, of course, be possible.

The portable device 3 may be any suitable (portable) device that has appropriate image sensing and processing capabilities. Thus it could be, for example, a mobile phone or tablet, or some form of wearable device that, e.g., includes a camera. In an embodiment the portable device 3 is in the form of a head-worn device, such as a headset or glasses, such as an AR head-mounted display, potentially coupled with a mobile phone for processing and communication.

As shown in FIG. 1, a detectable and identifiable marker 2 is arranged in the environment (in the corridor) 1, so that it can be seen in an image of the environment taken by the portable device 3. In the arrangement shown in FIG. 1, it is assumed that the marker 2 is visible (detectable) in the visible spectrum (and so may, e.g., and in an embodiment, be detected in images taken by a camera of the portable device 3).

In other arrangements, the marker 2 may be configured to also or instead be visible (detectable) other than in the visible spectrum. For example, an infrared visible marker or a UV visible marker could be used. This may allow the navigation system of the technology described herein to be used, for example, in poor or low lighting conditions (or, indeed, in darkness), without the need to light the environment, and may also be used to provide, for example, less intrusive or less obvious markers in the environment, which may, therefore, e.g., reduce human interference with the markers in the environment.

Figure 2:
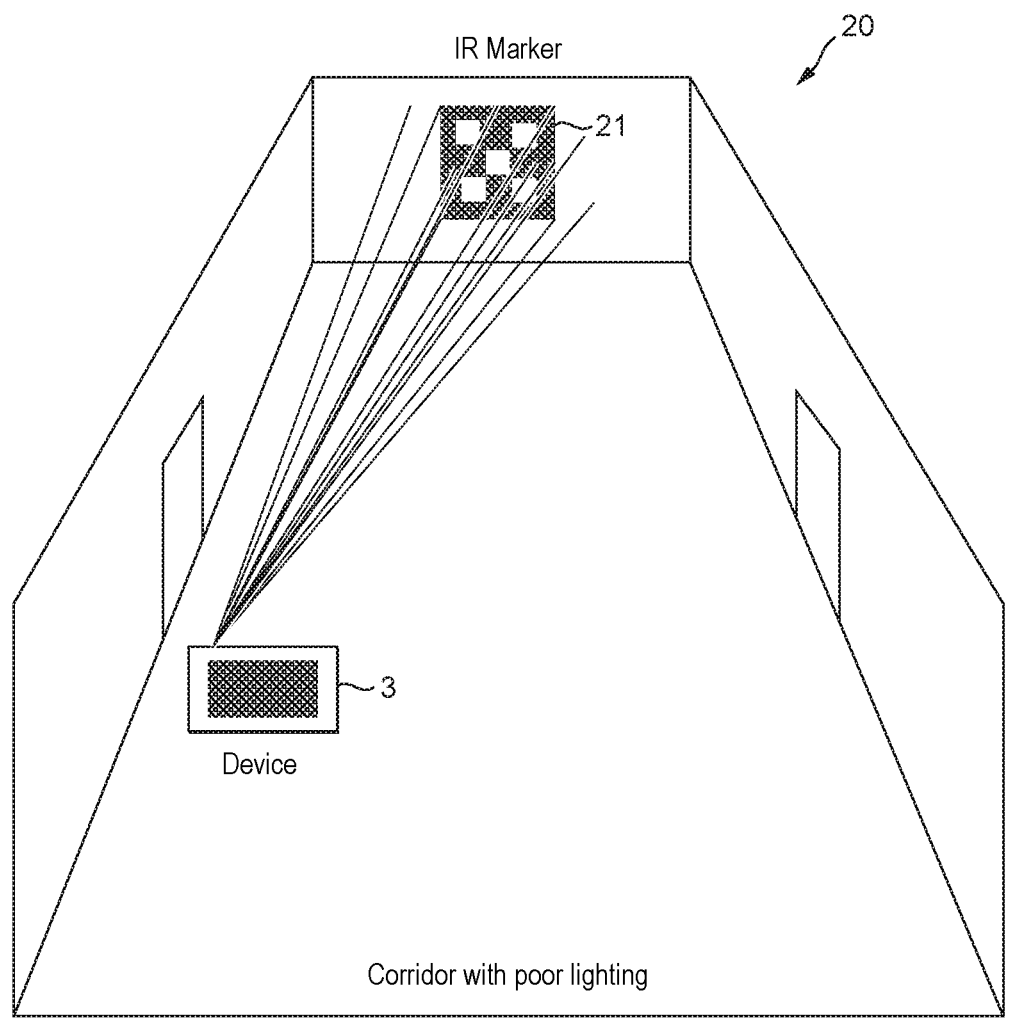

FIG. 2 shows an exemplary arrangement in a corridor 20 with poor lighting in which an infrared visible marker 21 can be detected by an appropriate infrared imaging sensor on the portable device 3. (To detect infrared-visible markers, the infrared filter of an existing device camera could, e.g., be removed, to allow the camera to also be sensitive to infrared.)

Although FIGS. 1 and 2 show only a single marker 2, 21, typically in embodiments of the technology described herein there will be a suitable set of plural markers distributed throughout the environment that is to be navigated, such as a marker located at each of appropriate locations within the environment. The markers should be appropriately distributed in the environment so as to be appropriately visible to portable devices being used in the environment and at suitable locations to facilitate navigation within the environment.

Figure 3:
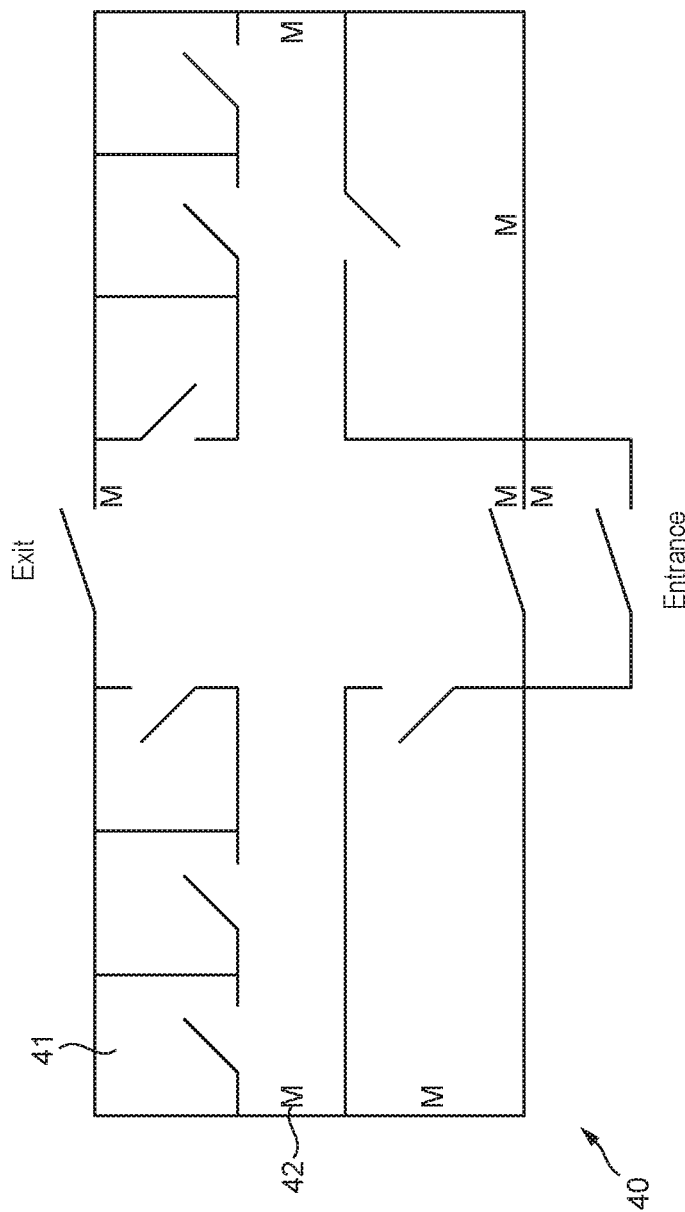

FIG. 3 illustrates this and shows an exemplary indoor environment 40 comprising a plurality of rooms 41 with respective markers 42 (M) distributed throughout the environment 40. The markers 42 are, e.g., mounted at an appropriate height, such as 1.2-2 m, on walls in the environment 40.

In the present embodiments, a portable device whose position in the environment is to be tracked will use its, e.g. camera, to view the environment and to provide images in which the "markers" distributed in the environment can be identified and thereby used to determine the location of the portable device 3 in the environment.

In the present embodiments, each marker of a set of markers that are distributed in an environment to be recognised are uniquely identifiable within the set of markers in question. This will then allow the particular marker that is currently visible to the portable device 3 to be identified, and, accordingly, as will be discussed further below, the location of the portable device 3 in the environment then to be determined from the identification of that marker.

The markers can be configured in any suitable and desired manner to be (uniquely) detectable within images of the environment.

As well as being able to be (uniquely) identified in the environment, the markers used in the present embodiments are markers from which the "pose" (i.e. the position and the orientation) relative to the marker of the image sensor, e.g. camera, which a portable device is using to view the marker, can be determined from an image including the marker. Thus the markers do not merely allow the fact that the portable device has reached a particular location in the environment to be determined, but also allow the position and orientation of the device within the environment relative to the marker to be determined (e.g. the facing direction of the device to be determined).

Thus the markers are configured so as to allow both the location and the orientation of the portable device within the environment to be determined.

The markers can have any suitable and desired form that allows them to be detectable in the environment and for the pose of the device to be determined therefrom. In an embodiment, the markers comprise binary square fiducial markers. Other forms of marker could be used, if desired.

Figure 4:
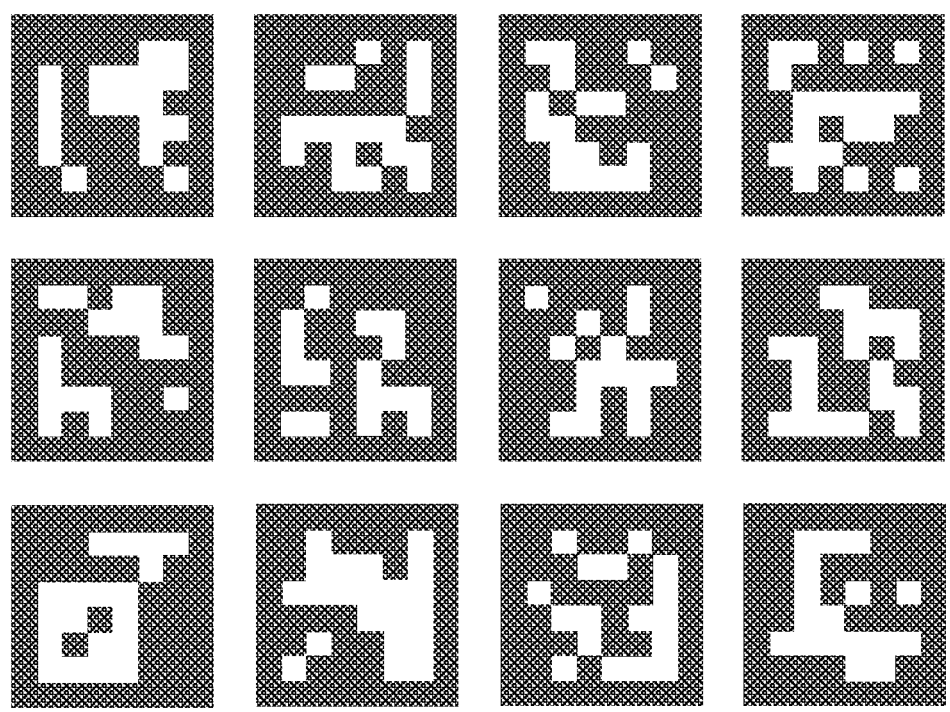
FIG. 4 shows various example markers that can be used in embodiments of the technology described herein.

FIG. 4 shows an exemplary set of markers 30 that can be used in the technology described herein (and that can be uniquely identified within the set and also allow the pose of a portable device relative to the marker to be determined from an image of the environment containing the marker).

Each of the markers in the set 30 will be positioned at different locations within the environment to be navigated, with a portable device that is in the environment then being able to have its location and orientation within the environment determined based on the detection of the markers in images of the environment taken by the portable device.

In operation in embodiments of the technology described herein, when it is desired to track the location of a portable device 3 within an environment containing markers in the manner of the technology described herein, the device will, as it moves through the environment, either periodically or continuously capture images of the environment, and some or all of those images will then be analysed to detect the presence of markers in the images. When a marker is detected in an image, the marker will be analysed to identify the particular marker in question and that particular marker will then be used to identify the location of the device in the indoor environment. (To facilitate this, the portable device will have access to (either stored locally or stored remotely but accessible, e.g. via the Cloud, to the portable device) an appropriate "navigation" database, such as a map of the environment in which the markers are located, and that stores, inter alia, the location of each marker in the environment, so that when a marker is identified in an image taken by the portable device 3, the corresponding location in the environment can be determined from the "navigation" database.)

In addition, a marker identified in an image taken by the portable device 3 will be analysed to determine the pose (orientation) of the portable device 3 relative to that marker. In this way, the location and orientation of the portable device 3 in the environment can be determined.

Once the location and orientation of the portable device 3 in the environment has been determined, that information can be used as desired. In an embodiment, this is used to display the location of the portable device and its orientation (e.g. facing direction) on a map, e.g., that is displayed on an appropriate screen of the portable device.

Figure 5:
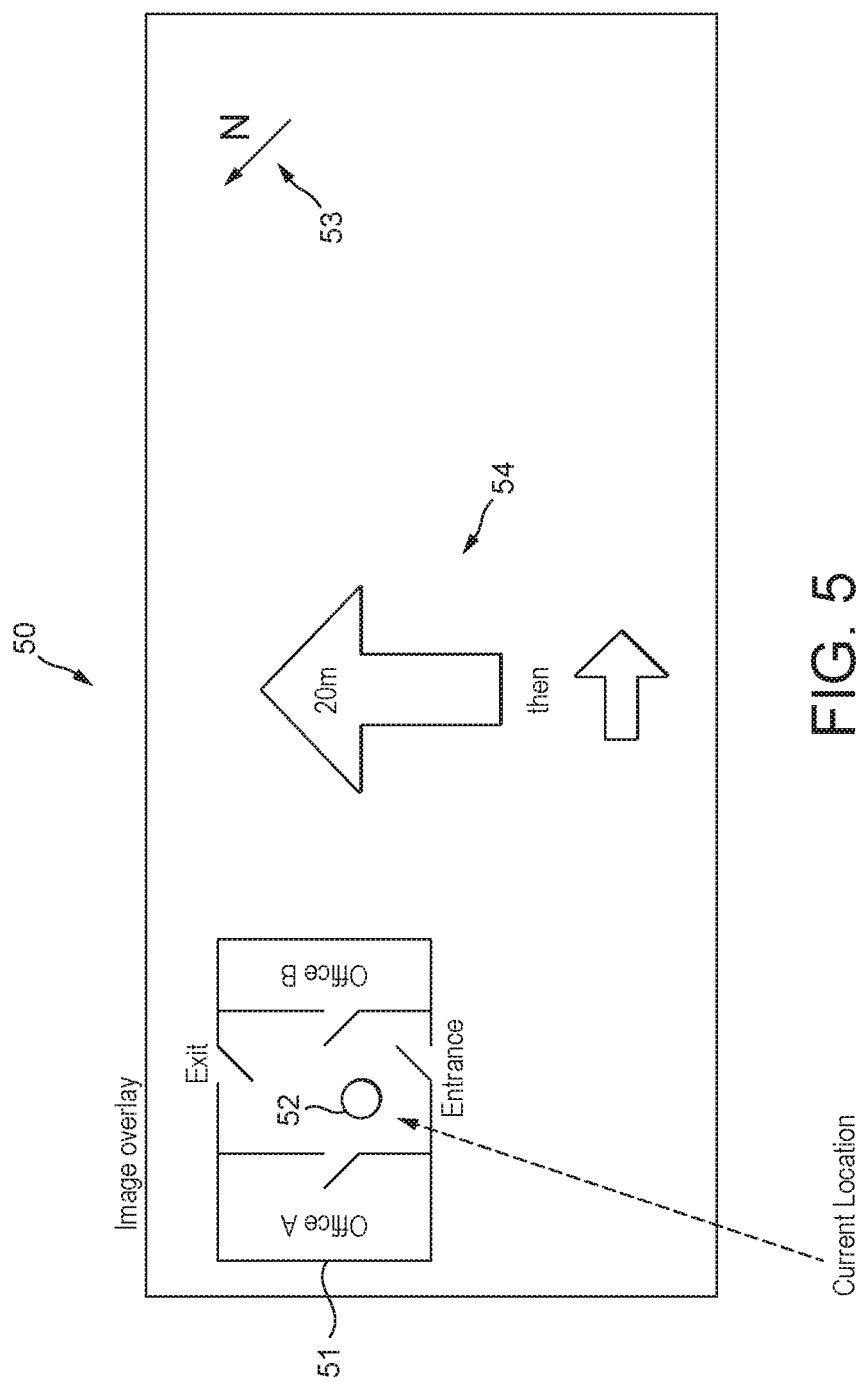
FIG. 5 shows an exemplary navigation display in an embodiment of the technology described herein.

FIG. 5 illustrates this, and shows an exemplary navigation display showing the location and orientation of a portable device 3 in an indoor environment that has been determined and is being navigated in the manner of the present embodiments.

FIG. 5 shows an exemplary display 50 that may, e.g., be overlaid on a physical view of the environment being navigated in an AR display (e.g. via an AR HMD). This display shows a map 51 of the environment the user is in, together with an indication 52 of the user's location, and the direction they are looking, a compass heading 53, and instruction direction arrows 54 (indicating in this example, 20 m followed by a right turn).

Other arrangements as well as or instead of actual display of the portable device's position on a map could be used if desired. For example, other forms of audio or visual indications, such as directions, or other information about the location reached, could be provided in response to determining the location and orientation of the portable device 3 in the environment, if desired. For example, the determination of the location could be used to trigger an appropriate event associated with that location.

Figure 6:
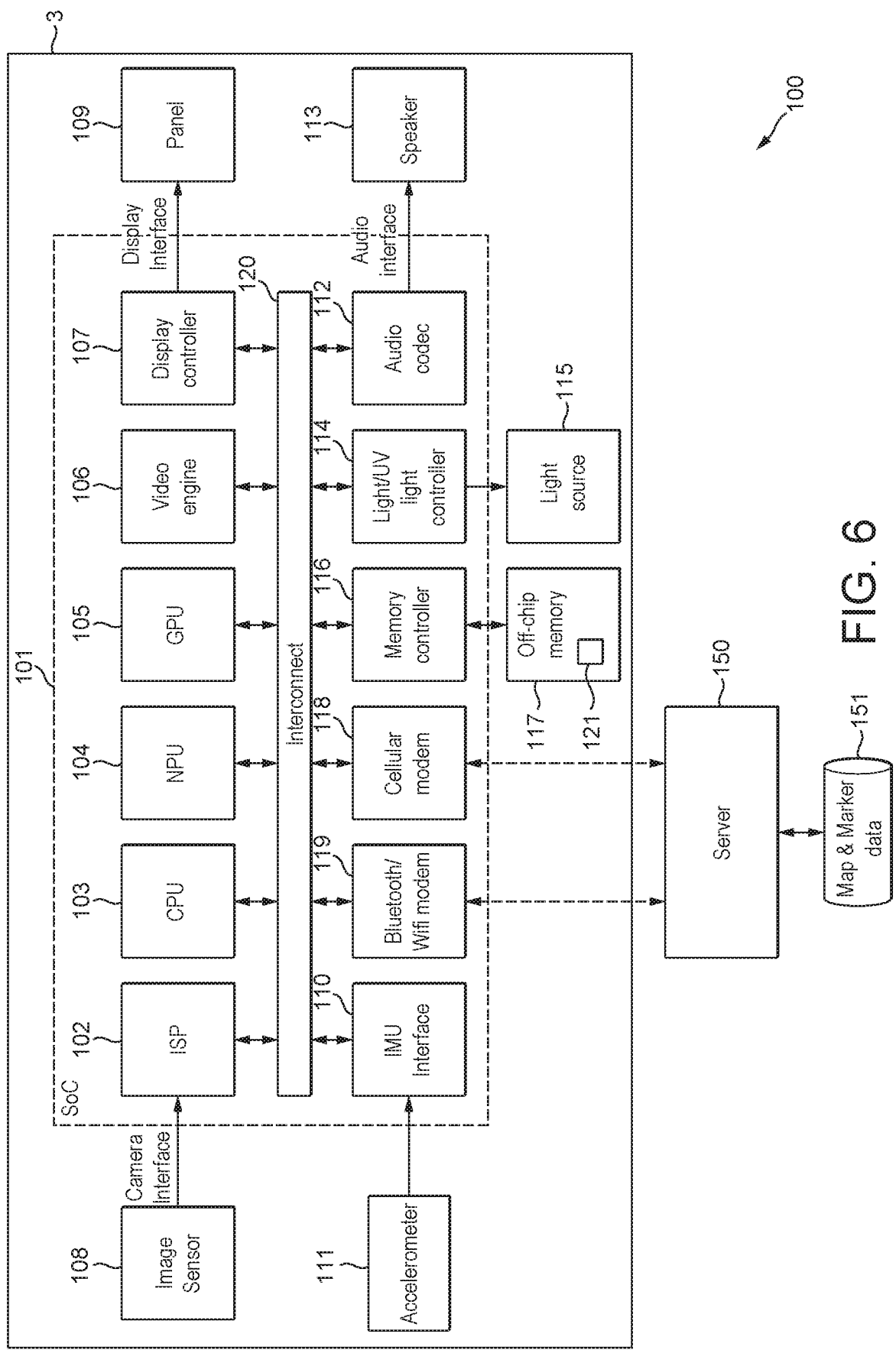
FIG. 6 shows schematically an embodiment of a navigation system that is in accordance with the technology described herein.

FIG. 6 shows schematically a data processing system 100 that can be operated as a navigation system in the manner of the present embodiments.

FIG. 6 shows the data processing system 100 as including both the portable device 3 and a remote server 150 that is accessible to and in communication with the portable device 3 and that stores, inter alia, the "navigation" database 151 that is used for the navigation system and that may also perform one or more of the image analysis, location determining, etc. processes of the present embodiments. For example, the server 150 may provide a "Cloud-based" navigation service that can be accessed by portable devices.

Other arrangements, such as all the functionality of the navigation system, including the appropriate "navigation database", being performed and stored locally on the portable device 3 would, of course, be possible.

As shown in FIG. 6, the portable device 3 includes a system on-chip (SoC) 101, which includes, inter alia, a number of processors (processing units), including an image signal processor (ISP) 102, a central processing unit (CPU) 103, a neural network processing unit (NPU) 104, a graphics processing unit (GPU) 105, a video engine (codec) 106 and a display controller 107.

As shown in FIG. 6, the image signal processor 102 is in communication with an image sensor 108, such as a camera, of the portable device 3. Correspondingly, the display controller 107 is in communication with an appropriate display panel 109 of the portable device 3.

As shown in FIG. 6, the system on-chip 101 further comprises an inertial measurement unit (IMU) interface 110 that is in communication with and receives inputs from inertial sensors, such as an accelerometer 111, of the portable device 3. This inertial measurement unit is configured to measure, e.g., the acceleration of the portable device 3.

The system on-chip 101 further comprises an audio codec 112 that is in communication with a speaker 113 of the portable device 3, a light source controller 114 that is in communication with an appropriate light source 115 of the portable device 3, a memory controller 116 in communication with off-chip memory 117 of the portable device 3, and appropriate wireless communications capabilities, in the present case in the form of a cellular modem 118 and a Bluetooth/WiFi modem 119 to facilitate communication with the remote server 150 of the data processing system.

The light source 115 may comprise a light emitting diode (in the case where markers are to be detected in visible spectrum), and/or an appropriate UV/IR source (in the case where markers are to be detected in the UV/IR spectrum), for example.

The portable device 3 may also, if desired, include some form of haptic (tactile) feedback device, so as to be able to provide tactile feedback (e.g. shaking or vibrating, etc.), to a user and to provide navigation instructions using tactile feedback. For example the portable device could be coupled to a separate wearable device, such as a watch or bracelet, that is able to provide tactile feedback when navigating an environment.

The various elements of the system on-chip 101 communicate with each other via an appropriate interconnect 120.

In this system, the server 150 has access to and stores an appropriate navigation database 151 for one or more indoor environments in which it may be desired to track the location of the portable device 3 for navigation purposes. There may, e.g., be a separate navigation database for each of plural different indoor environments that a navigation system supports.

Each navigation database will store, for example, an appropriate map of the environment in question, together with data indicating the locations of the particular markers within that environment (and the identity of the markers at the particular locations within the environment). A navigation database may, for example, store for each marker, one or more of, and in an embodiment all of: the size of the marker, the marker's unique attributes, the marker's absolute position (x, y, z location) in the environment, and the marker's rotational orientation in the environment. It may also store other information that is related to the marker in question (and, e.g., that can be triggered by recognition of the marker in question).

In this system, the portable device may store a navigation application (app) 121 that when executed on the CPU 103 triggers the navigation operation in the manner of the present embodiments. Thus, a user of the portable device 3 may activate the navigation application 121 when they wish to navigate an environment (that the application supports).

In operation of this navigation system, the image sensor 108 of a portable device 3 will (automatically and continuously) capture images of the environment that the portable device is present in. These images will then analysed, e.g. using computer vision techniques (e.g. using classical computer vision algorithm(s) and/or a neural network), (while the navigation application is being used) to look for the presence of appropriate navigation markers in the environment, and to, when a navigation marker is detected in an image of the environment, then identify the particular marker that has been identified and the pose of the image sensor of the portable device 3 relative to that marker. These image analysis operations may be performed on an appropriate processor of the portable device 3, such as the CPU 103 or the NPU 104, or alternatively the images may be transmitted to the server 150 with the server 150 then performing the appropriate image analysis and marker detection and identification.

Once a marker has been identified in an image, the location of the marker in the environment will be determined from the information in the navigation database 151 that stores the locations of the markers in the environment. In this case, where the identification and detection of the marker is performed on the portable device 3, the relevant identified marker information can then be transmitted to the server 150 for the appropriate location information to then be retrieved from the navigation database 151. Alternatively, where the server 150 performs the marker detection and identification, it can then directly use that information to interrogate the navigation database 151 to determine the location of the marker.

The image analysis also determines the pose of the portable device relative to the marker from the image of the environment containing the marker. The actual position of the portable device in the environment is then determined from the position relative to the marker given by the determined pose relative to the marker and from the location of the marker in the environment determined from the stored navigation information. Correspondingly, the determined pose of the portable device relative to the marker also provides the orientation of the portable device in the environment.

The determined location and orientation of the portable device 3 can then be returned to the portable device 3 (e.g. to an appropriate application executing on the CPU 103 of the portable device 3), with the CPU 3 (e.g. the navigation application) then operating to trigger the display on an appropriate map on the display 109 of the portable device 3 showing the determined location and orientation of the portable device 3 in the environment.

The map display can be provided and configured as desired. For example, the portable device's position could be rendered on a plane map of the environment in question, for example using an appropriate computer game engine. In this case, a floor plan could be rendered as a texture onto a plane, with the plane being scaled to provide a one-to-one mapping between distances on the plane and the real environment. The position of the user could indicated on a map using a clearly visible object, such as a pointer, with the image being rendered as if from a virtual camera which is always behind the user so as to provide the user with a clear view of their position on the map and of a map of the environment in front of them (based on the pose derived from the identification of the marker in the image of the environment).

This will then be repeated for further images captured by the image sensor 108, and so on, so as to track and navigate the portable device 3 in the environment in question.

Figure 7:
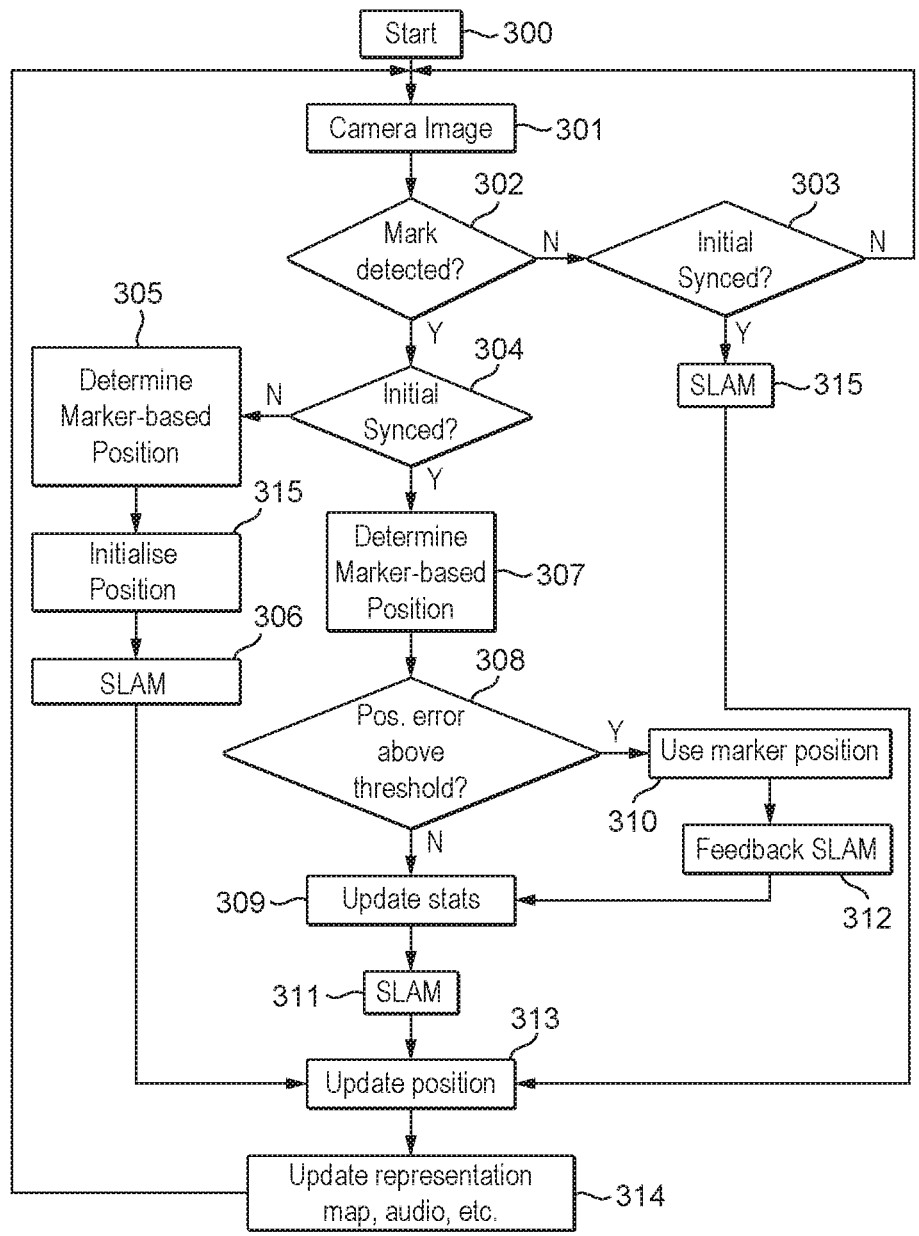
FIG. 7 is a flow diagram showing a method of determining the location of a portable device in an environment in an embodiment of the technology described herein.

FIG. 7 is a flowchart showing the operation of an embodiment of the technology described herein as a SLAM (Simultaneous Location and Mapping) operation in which the visual detection of markers in the manner of the technology described herein is used in combination with SLAM navigation tracking to provide initial location synchronisation of the user to the map position and automatic periodic resynchronization of the user to their actual map position to compensate for SLAM-based tracking drift (position error) over time, so as to thereby keep the user position better synchronised with the map than if using SLAM-based tracking alone. This method may be implemented, for example, using a data processing system of the form illustrated in FIG. 6.

As shown in FIG. 7, when it is desired to start the navigation process in this embodiment (step 300), an initial image from the image sensor (e.g. camera) 108 is obtained (step 301). This image is then analysed using suitable techniques to determine whether a marker is present in the image (step 302).

If, at step 302, a marker is not detected in the initial image, then the data processing system will not be able to determine the starting position of the portable device, and so will not be able to initialize its location within the environment. As such it may be determined that an initial synchronisation of the portable device has not yet happened (step 303), and so the process may return to capture another image using the image sensor (e.g. camera) 108, and so on, until an image that contains an appropriate marker is detected at step 302.

To facilitate this operation, the user may, e.g., be prompted to locate a marker in the environment so that an image of that marker can be obtained so as to facilitate the initial position synchronisation process.

(In the case where a marker is not detected in an image, but it is determined at step 303 that the position of the portable device has been initially synchronised, then as shown in FIG. 7, in that case the data processing will continue SLAM-based tracking of the position of the portable device 3 (step 315) and use that tracking to update information indicative of the location of the portable device within the environment (step 313), which in turn may be used to update a representation of the location of the portable device 3 which is provided to a user (step 314).)

When, at step 302, a marker is detected in an image (e.g. in the initial image or a subsequent image), a check is made as to whether or not an initial synchronisation has been made (step 304).

In the case that the initial synchronisation has not yet been made, then the initial synchronisation will be performed using the detected marker. As shown in FIG. 7, this process will involve determining the position of the portable device based on the particular marker that has been detected in the environment in question (as discussed above) (step 305), and initialising the position of the portable device to that position (step 315).

Once the initial synchronisation has been made in this manner, the data processing system may then begin SLAM-based tracking of the position of the portable device 3. This may use images of the environment, together with, e.g., inertial tracking using inputs from the accelerometer 111 and inertial measurement unit 110, and appropriate SLAM techniques (algorithms) (step 306). The output of this SLAM process will then be used to update information indicative of the location of the portable device 3 within the environment (step 313), which in turn may be used to update a representation of the location of the portable device 3 which is provided to a user, such as by updating a map or by providing an audio indication of the location, etc. (step 314).

The portable device 3 will then continue to periodically capture images of the environment (at step 301) as the portable device is used in the environment for navigation purposes, and analyse those images to determine if they contain appropriate navigation markers or not (at step 302).

(The next image that is analysed to see if it contains a navigation marker may be the image that immediately follows the current image in a sequence of images produced by the image sensor 108, or some other image later in a sequence of images produced by the image sensor 108. For example, each image captured by the image sensor 108 may be analysed, or images may only be analysed periodically, e.g. after particular time periods have elapsed, and/or when the portable device is determined to have moved a particular distance, or to have reached a particular location in the environment.)

Again, when an image falls to be analysed to determine if it contains a navigation marker at step 302, the image will then be analysed to determine whether or not a marker is present in the image. (The process would be repeated (if necessary) on subsequent images, until a marker is again detected.)

In this case, since the initial synchronisation has been performed, rather than using the detected marker in the image to perform initial synchronisation for the SLAM process, the marker detected in the image is instead used to, if necessary, correct the location of the portable device 3 as determined by the SLAM process. In other words, the detection of the navigation marker in an image is used to, if necessary, resynchronize the position of the portable device 3 in the environment, thereby, in effect and in particular, compensating for any drift over time of the tracking using the SLAM process.

Thus, as shown in FIG. 7, when a marker is detected in a subsequent image after initial synchronisation has taken place, the position of the portable device based on the particular marker that has been detected is again determined (step 307).

As shown in FIG. 7, at this point a determination is made (at step 308) as to whether the location as determined using the navigation marker is sufficiently close to the location of the portable device that has been determined using the SLAM process. This may comprise determining whether the location as currently determined using the SLAM process is within a threshold distance of the location as determined using the navigation marker.

In the event that the current location as determined using the SLAM process is sufficiently similar to the location as determined using the location marker (e.g. when the difference is below the threshold), then the SLAM process is continued, using the position as currently determined by the SLAM process (step 311).

Optionally, SLAM statistics may also be updated in view of the fact that the current location as determined using the SLAM process is sufficiently similar to the location as determined using the location marker, for example by updating statistics to indicate that the current location as determined using the SLAM process is relatively accurate (step 309).

The output of the SLAM process will then again be used to update information indicative of the location of the portable device 3 within the environment (step 313), which in turn may be used to update a representation of the location of the portable device 3 which is provided to a user, such as by updating a map or by providing an audio indication of the location, etc. (step 314).

On the other hand, in the event that the location as currently determined by the SLAM process is too dissimilar to the location as determined using the navigation marker (i.e. where the difference at step 308 is above the threshold), then the navigation system updates its current record of the location of the portable device 3 in the environment to correspond to the location as determined using the navigation marker (step 310). In this way, the navigation marker detection is used to "resynchronize" the user's position with the environment (map) (and thereby to correct for any SLAM "drift").

This updated (resynchronized) position is then fed back to the SLAM process for use as the starting point for the SLAM process going forwards (step 312). The SLAM statistics may also be updated to indicate that a position error has occurred (step 309).

The SLAM process is then continued (step 311), but using the position as determined from the navigation marker as the current position of the portable device.

The output of the SLAM process will again then be used to update information indicative of the location of the portable device 3 within the environment (step 313), which in turn may be used to update a representation of the location of the portable device 3 which is provided to a user, such as by updating a map or by providing an audio indication of the location, etc. (step 314).

This process will then be repeated in respect of the next captured image of the environment, and so on, so as to continuously determine the position of the portable device 3 in the environment, i.e. so as to navigate the environment.

Various alternatives or additions to the above described embodiments would be possible, if desired. For example, as well as allowing the portable device's location and pose to be determined, the navigation markers could also be used to convey other information (that can be triggered or identified from a recognition of the marker in question in an image). For example, a marker could (visually) include the identity of navigation database (map) for the environment that the marker relates to, and/or the location where the navigation database (e.g. map) of the environment that the marker relates to is stored.

It would also be possible for the system to be configured to provide "feedback" on the markers in the environment in use, for example relating to their distribution. For example, the system could be operable to identify and report missing or moved markers in use, for example by cross-referencing a marker's detected position with the stored position of the marker in the navigation database in the environment. The system could also be operable to monitor whether any determined location drift between navigation markers, for example, is too much, such that a different marker distribution in the environment might be beneficial.

The navigation information (or a portion of the navigation information), e.g. map, could be derived from (contained in) the marker itself, or the location of the navigation information could be indicated by a marker so that that data can be accessed.

The portable device that is being used to navigate the environment may consist of a number of components that work together, such as an e.g. AR, head mounted display, e.g. with a camera, display, microphone system, coupled to a mobile phone with processing and communication-based capabilities, and, optionally, together with some further wearable tactile/haptic feedback device, such as a watch or bracelet.

The system could also require the portable device and/or a user of the portable device to be authenticated, with the navigation information then being selected and provided based upon the user's/device's privilege level. For example, the level of (and/or level of detail of) navigation information that is provided could be based (dependent) on, e.g., the authentication and/or access privileges of the device/user in question.

Some or all of the navigation data may be stored in the Cloud, or downloaded locally.

It would also, for example, be possible to trigger an alert if a portable device/user is determined to enter an area that is restricted to them. For example, a device/user entering a secure area could be flagged to the system.

It can be seen from the above that the technology described herein, in its embodiments at least, provides a method of and apparatus for determining the position of a portable device in an environment that can be performed in a particularly convenient and straightforward manner and that does not, for example, require the installation of costly infrastructure in the environment to be navigated and that can, in particular, be used to navigate environments, such as indoor environments, where other navigation techniques may be less suitable.

This is achieved, in the embodiments of the technology described herein at least, through the recognition of the presence of markers in images captured of the environment, with the location of the portable device in the environment then being determined based on the detected markers in the images of the environment.

The technology described herein can, in particular, be used to address problems of initialisation and resynchronization in existing SLAM (Simultaneous Location and Mapping) techniques, in a manner that can conveniently be employed in many environments and without the need for the installation of costly infrastructure in the environment to be navigated. Furthermore, it can allow navigation to be performed using readily available and relatively low cost portable devices. In particular, the technology described herein, in its embodiments at least, does not require the use of dedicated hardware or additional hardware in a portable device that is to be used for navigating within an environment.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A navigation system for determining the location of a portable device in an environment, the navigation system comprising:
   a stored set of navigation information representative of an environment to be navigated, the stored navigation information representative of the environment including information indicative of the static location within the environment of static unpowered markers in a set of plural static unpowered markers arranged within the environment and located at respective particular static locations within the environment, each static unpowered marker located at a respective particular location within the environment and being configured so as to be identifiable in an image of the environment and so as to allow the pose of a portable device that has taken an image of the environment containing the static unpowered marker to be determined from the image of the environment containing the static unpowered marker;
   a portable device comprising an image sensor operable to take images of an environment;
   an image analysis system configured to analyse images taken of an environment by a portable device and to determine whether a static unpowered marker of a set of plural static unpowered markers arranged within an environment and located at respective particular static locations within the environment is present in an image taken by the portable device and to, when a static unpowered marker is identified in an image taken by a portable device, determine the pose of a portable device based on the image of the static unpowered marker;
   a navigation processing system configured to use information indicative of a static unpowered marker identified in an image of an environment, the pose of a portable device determined by the image analysis system, and the stored navigation information representative of an environment to be navigated, to determine the location and orientation of the portable device in the environment to be navigated; and
   a SLAM and/or an inertial tracking system configured to track movement of the portable device in an environment;
   wherein:
   the navigation system uses both the detection of static unpowered markers located at respective particular static locations within an environment in images of the environment and the SLAM and/or inertial tracking process to determine and track the location of the portable device in the environment; and
   the determination of the location of the portable device in the environment using the detection of the static unpowered markers located at respective particular static locations within the environment in images of the environment is used to initialize the location of the portable device in the environment for the SLAM and/or inertial tracking process, and to correct for drift of the SLAM and/or inertial tracking determination of the location of the portable device in the environment in use.

2. The system of claim 1, wherein the static unpowered markers are detectable in the infrared spectrum and/or in the ultraviolet spectrum.

3. The system of claim 1 wherein the static unpowered markers comprise existing objects in the environment.

4. The system of claim 1, further comprising a set of plural static unpowered markers that have been added to the environment to be navigated at respective particular static locations within the environment, each static unpowered marker located at a respective particular location within the environment being configured so as to be identifiable in an image of the environment and being configured so as to allow the pose of a portable device that has taken an image of the environment containing the static unpowered marker to be determined from the image of the environment containing the marker.

5. The system of claim 1, wherein as well as allowing a portable device's pose to be determined, further information can also be determined from the recognition of a static unpowered marker in an image of the environment.

6. The system of claim 1, wherein the portable device is configured to take and/or analyse images of an environment being navigated based on movement of the portable device in the environment.

7. The system of claim 1, wherein the portable device is configured to automatically analyse images of the environment for the presence of static unpowered markers while the SLAM and/or inertial tracking is being performed.

8. The system of claim 1, wherein the navigation system is further configured to collect information relating to the distribution of static unpowered markers in an environment based on the identification of markers in images of the environment taken by a portable device that is navigating the environment.

9. A method of determining the location of a portable device in an environment being navigated, the method comprising:
   the portable device taking one or more images of the environment being navigated;
   an image analysis system determining whether a static unpowered marker of a set of plural static unpowered markers arranged within the environment being navigated and located at respective particular static locations within the environment is present in an image of the environment taken by the portable device;

and when a static unpowered marker is identified in an image taken by the portable device:
the image analysis system determining the pose of the portable device based on the image of the static unpowered marker; and
a navigation processing system determining the location and orientation of the portable device in the environment being navigated based on the static unpowered marker identified in the image of the environment, the determined pose of the portable device, and stored navigation information representative of the environment being navigated, the stored navigation information representative of the environment being navigated including information indicative of the location within the environment of the static unpowered markers in the set of plural static unpowered markers arranged within the environment being navigated;
the method further comprising:
using a SLAM and/or an inertial tracking system to track movement of the portable device in the environment; and
using both the detection of static unpowered markers located at respective particular static locations within the environment in images of the environment and the SLAM and/or inertial tracking process to determine and track the location of the portable device in the environment;
wherein using both the detection of static unpowered markers located at respective particular static locations within the environment in images of the environment and the SLAM and/or inertial tracking process to determine and track the location of the portable device in the environment comprises using the determination of the location of the portable device in the environment using the detection of static unpowered markers located at respective particular static locations within the environment in images of the environment to initialize the location of the portable device in the environment for the SLAM and/or inertial tracking process, and to correct for drift of the SLAM and/or inertial tracking determination of the location of the portable device in the environment in use.

10. The method of claim 9 wherein the static unpowered markers comprise existing objects in the environment and/or markers that have been added to the environment to be navigated.

11. The method of claim 9, further comprising determining further information from the recognition of a static unpowered marker in an image of the environment.

12. The method of claim 9, comprising the portable device taking and/or analysing images of the environment being navigated based on movement of the portable device in the environment.

13. The method of claim 9, further comprising the portable device automatically analysing images of the environment for the presence of static unpowered markers while the SLAM and/or inertial tracking is being performed.

14. The method of claim 9, further comprising collecting information relating to the distribution of static unpowered markers in the environment based on the identification of markers in images of the environment taken by the portable device.

15. The method of claim 1, wherein the environment being navigated is an indoor environment.

16. A method of operating a portable device in a navigation system, which navigation system is operable to determine the location of the portable device in an environment, the method comprising:
the portable device:
taking images of an environment being navigated using the portable device;
providing images taken of the environment being navigated to an image analysis system configured to analyse images taken of an environment by the portable device and to determine whether a static unpowered marker of a set of plural markers static unpowered arranged within an environment and located at respective particular static locations within the environment is present in an image taken by the portable device and to, when a static unpowered marker is identified in an image taken by the portable device, determine the pose of a portable device based on the image of the static unpowered marker; and
receiving information indicative of a location and orientation of the portable device in the environment being navigated determined by a navigation processing system configured to determine the location and orientation of a portable device in an environment from information indicative of a static unpowered marker that is located at a particular static location within the environment identified in an image of an environment, the pose of a portable device determined by the image analysis system, and stored navigation information representative of an environment to be navigated, the stored navigation information representative of the environment being navigated including information indicative of the static location within the environment of the static unpowered markers in the set of plural markers arranged within the environment being navigated;
the portable device determining and tracking its location in the environment using a SLAM and/or inertial tracking system;
using the received information indicative of a location and orientation of the portable device in the environment being navigated, that was determined by a navigation processing system configured to determine the location and orientation of a portable device in an environment from information indicative of a static unpowered marker that is located at a particular static location within the environment identified in an image of an environment, to initialize the location of the portable device in the environment for the SLAM and/or inertial tracking process, and to correct for drift of the SLAM and/or inertial tracking determination of the location of the portable device in the environment in use; and
providing an output to a user of the portable device based on the determined location and orientation of the portable device in the environment being navigated.

17. A non-transitory computer program comprising computer software code that when executed on a processor or processors performs a method of determining the location of a portable device in an environment being navigated, the method comprising:
the portable device taking one or more images of the environment being navigated;
an image analysis system determining whether a static unpowered marker of a set of static unpowered plural markers arranged within the environment being navigated and located at respective particular static locations within the environment is present in an image of the environment taken by the portable device;

and when a static unpowered marker is identified in an image taken by the portable device:

the image analysis system determining the pose of the portable device based on the image of the static unpowered marker; and a navigation processing system determining the location and orientation of the portable device in the environment being navigated based on the static unpowered marker identified in the image of the environment, the determined pose of the portable device, and stored navigation information representative of the environment being navigated, the stored navigation information representative of the environment being navigated including information indicative of the location within the environment of the static unpowered markers in the set of plural static unpowered markers arranged within the environment being navigated;

the method further comprising:

using a SLAM and/or an inertial tracking system to track movement of the portable device in the environment; and using both the detection of static unpowered markers in images of the environment and the SLAM and/or inertial tracking process to determine and track the location of the portable device in the environment;

wherein using both the detection of static unpowered markers located at respective particular static locations within the environment in images of the environment and the SLAM and/or inertial tracking process to determine and track the location of the portable device in the environment comprises using the determination of the location of the portable device in the environment using the detection of static unpowered markers located at respective particular static locations within the environment in images of the environment to initialize the location of the portable device in the environment for the SLAM and/or inertial tracking process, and to correct for drift of the SLAM and/or inertial tracking location determination of the portable device in the environment in use.

* * * * *